United States Patent [19]

Hon

[11] 4,067,589
[45] Jan. 10, 1978

[54] FOLDABLE BICYCLE

[76] Inventor: David T. Hon, 2522 Banyan Drive, Los Angeles, Calif. 90049

[21] Appl. No.: 688,712

[22] Filed: May 21, 1976

[51] Int. Cl.² ............................................. B62K 15/00
[52] U.S. Cl. .................................. 280/278; 280/287; 74/594.7
[58] Field of Search ............... 280/259, 278, 287; 297/195; 248/188.5; 74/594.1, 594.7

[56] References Cited

U.S. PATENT DOCUMENTS

| | | | |
|---|---|---|---|
| 518,330 | 4/1894 | Ryan | 280/287 X |
| 561,665 | 6/1896 | Hubbell | 280/287 X |
| 1,584,568 | 5/1926 | Clark | 280/278 |
| 2,372,024 | 3/1945 | Schwinn | 280/287 |
| 2,384,139 | 9/1945 | Schwinn | 74/594.7 |
| 2,708,587 | 5/1955 | Zuck | 280/278 |
| 2,777,711 | 1/1957 | Yokomaki | 280/287 |
| 3,074,741 | 1/1963 | Rutkove | 280/278 |
| 3,876,231 | 4/1975 | Geisel | 280/278 |

FOREIGN PATENT DOCUMENTS

| | | | |
|---|---|---|---|
| 266,946 | 8/1929 | Italy | 74/594.7 |
| 604,113 | 6/1948 | United Kingdom | 280/287 |

Primary Examiner—Joseph F. Peters, Jr.
Assistant Examiner—Terrance L. Siemens
Attorney, Agent, or Firm—Robert J. Schaap

[57] ABSTRACT

A foldable bicycle including a frame having a seat structure and a handlebar structure thereon. A front wheel is rotatably mounted on the frame structure through a front column, and a rear wheel is mounted on the frame structure and is powered through a pedal structure including a sprocket connected to the rear wheel by a chain drive. The main frame is foldable about a hinge point in the area of the sprocket through a unique hinge release and locking mechanism. Moreover, the front wheel is rotatable through the front column in a 180° arc so that the front and back wheels become axially aligned when the hinge locking mechanism is released so that a front portion of the frame section can swing about in a 180° arc to become somewhat parallel to a rear portion thereof. In addition, the present invention provides a unique seat structure which can be collapsed and raised to a desired level. Moreover, the fenders can be constructed with relatively light weight and can be easily attached to and removed from the bicycle by a snap fitting action.

44 Claims, 14 Drawing Figures

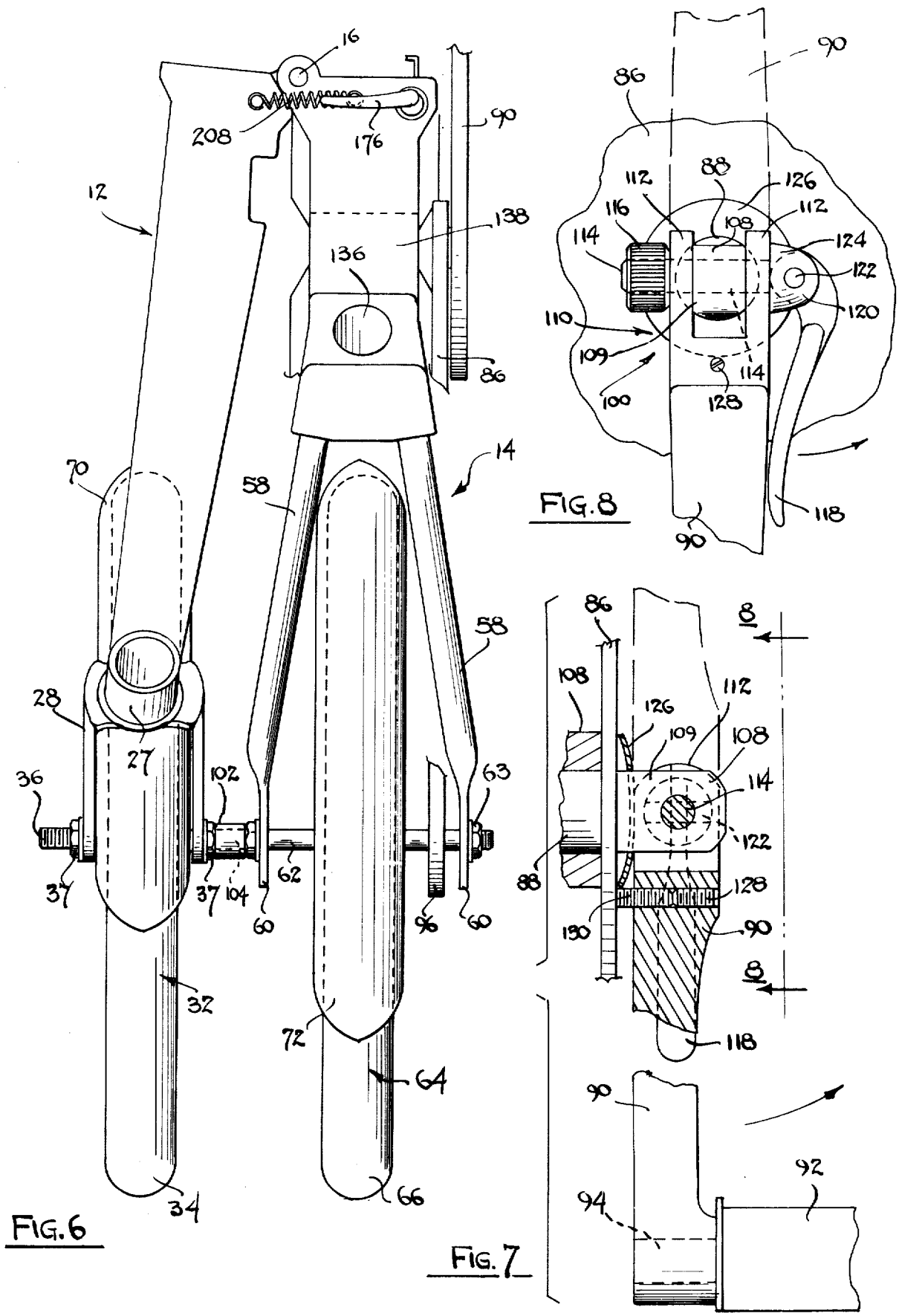

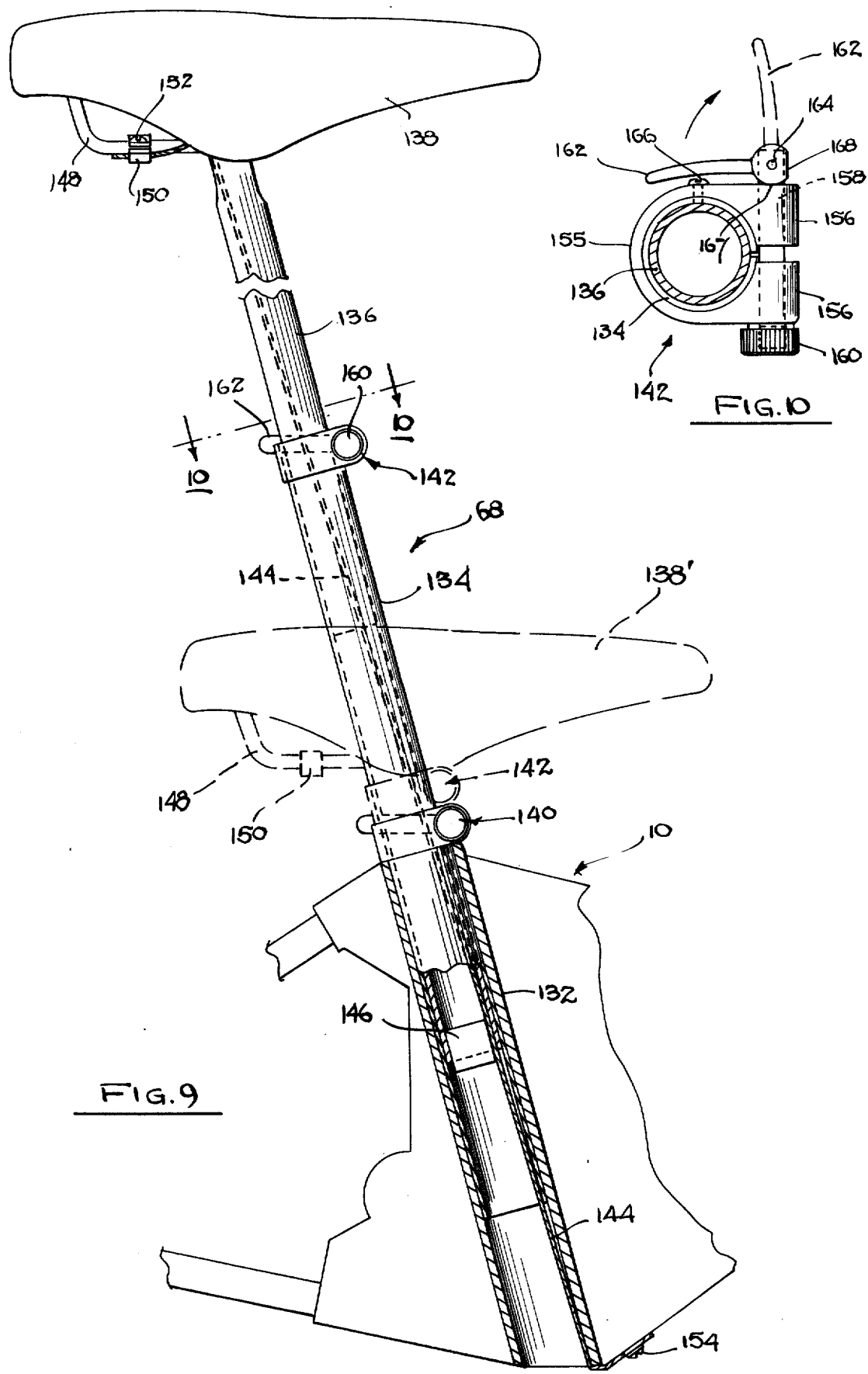

U.S. Patent  Jan. 10, 1978  Sheet 5 of 5  4,067,589
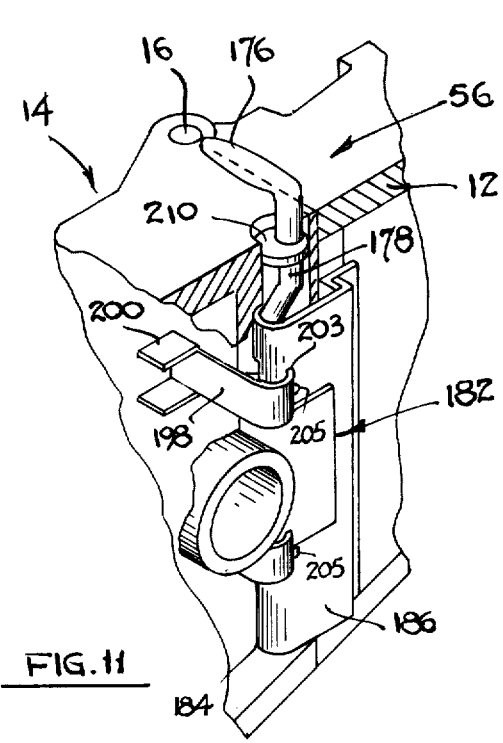
FIG. 11
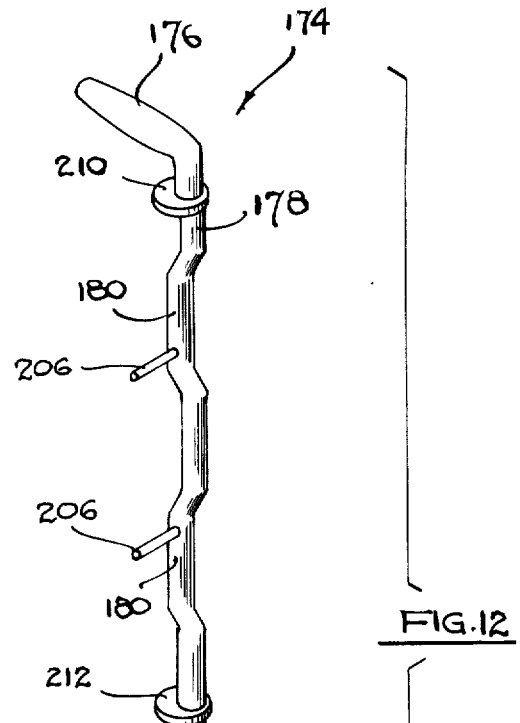
FIG. 12
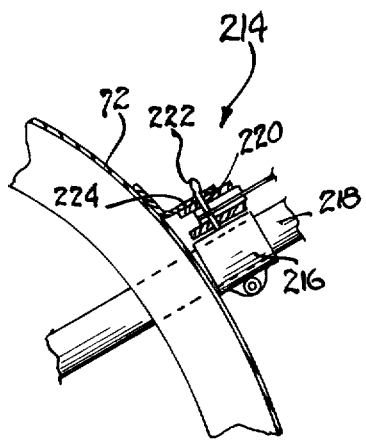
FIG. 13
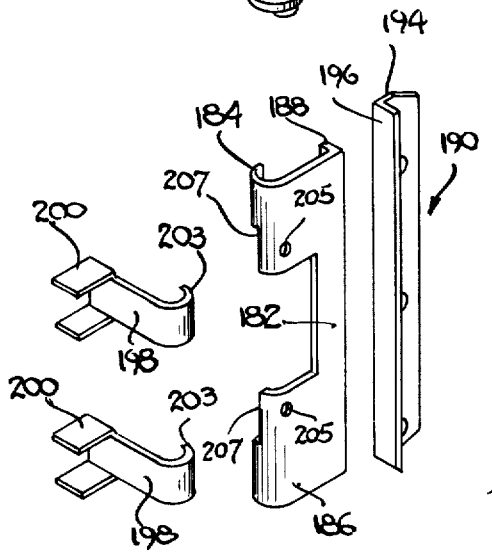

FOLDABLE BICYCLE

BACKGROUND OF THE INVENTION

This invention relates, in general to certain new and useful improvements in foldable bicycles and, more particularly, to foldable bicycles which are made of a relatively light weight construction which are capable of being easily folded and unfolded.

In recent years, there has been an emergence of designs and various produced and commercially available foldable bicycles of the two-wheeled structure which include a main frame, a seat, a handlebar structure and a pair of wheels mounted on the main frame. These various forms of foldable bicycles are designed to either be folded or otherwise collapsed in order to fold into somewhat of a compact unit for storage and easy transport. However, these foldable bicycles included many inherent disadvantages which are hereinafter described.

With respect to the foldable bicycles which were heretofore available and many of which are presently available, these bicycles usually include a main frame which can be folded about a hinge axis and a handlebar structure which can be folded downwardly as well as a collapsible seat structure. However, when these bicycles are folded, they do not necessarily form a relatively small compact unit. Moreover, when folded, they are not designed so that they can be pushed along the ground or other supporting surface.

It has been well established that for best handling by an average-sized adult, relative positions of the seat post, handlebars, pedal cranks and the like should adhere to conventional pre-established positioned relationship. Moreover, the bicycle should be designed so that it can be opened to the desired size and with the desired positioned relationship to the collapsed or folded components. Nevetheless, one of the serious disadvantages of these foldable bicycles is that when they are opened for riding, they are not easily opened to achieve the desired size as when initially collapsed.

One of the principal problems of the foldable bicycles heretofore available is that the bicycle is not necessarily sufficiently light in weight to enable the bicycle to be portable when in the folded condition. These presently available foldable bicycles are still somewhat heavy in their construction due to the fact that they are formed of steel and other heavy metals. The criterion of a small folded size of a bicycle must necessarily affect the frame design, and in the case of the prior art, the frame designs do not make full use of the desired structure in a full-sized adult bicycle. Moreover, there has also been some compromise in the strength to weight ration in order to achieve minimum design size.

One of the primary problems with the presently available foldable bicycles is that the bicycles are constructed in such manner that they are inconvenient if not difficult to fold and unfold. In many cases more than one person may be required to unfold the bicycle or otherwise to completely fold the bicycle and lock the same in the folded condition.

It is therefore the primary object of the present invention to provide a foldable bicycle which has a high strength-to-weight ratio type of construction and which can be folded very efficiently and quickly into a relatively small, compact unit and easily unfolded or reopened to its original rideable condition.

It is a further object of the present invention to provide a foldable bicycle of the type stated which can be folded form an opened position and reopened with the components thereof assuming substantially the same positional relationship in the reopened position.

It is another object of the present invention to provide a foldable bicycle of the type stated which is highly durable in its construction and which can be made in a wide variety of sizes.

It is an additional object of the present invention to provide a foldable bicycle of the type stated which can be folded in such position that the front and reat wheels have central parallel aligned axes to enable convenient rolling of the bicycle on the ground or other supporting surface.

It is also an object of the present invention to provide a foldable bicycle of the type stated in which the bicycle can be folded in a unique manner to generate a relatively small, compact unit, and which does not otherwise sacrifice strength-to-weight ratio or efficiency and convenience in folding and opening the bicycle.

It is another salient object of the present invention to provide a method of collapsing and opening a bicycle in which the various components thereof can be collapsed or otherwise folded and thereafter reopened to the same preestablished positional relationship.

With the above and other objects in view, my invention resides in the novel features of form, construction, arrangement and combination of parts presently described and pointed out in the claims.

GENERAL DESCRIPTION

The present invention relates to a foldable bicycle which includes a front frame section and a rear frame section. The two frame sections are hingedly connected to each other through a mid hinge pin defining a mid hinge axis. The front frame section includes a column. Wheel retaining forks are mounted with respect to the column for rotation about the central axis of the column. A front wheel is rotatably mounted with respect to forks by means of a front wheel axle. Moreover, a releaseable locking mechanism retains a pair of handlebars in operative relationship to the forks such that the handlebars can rotate the forks through the axis of the column, and hence, rotate the front wheel about the axis of the column.

The handlebar locking mechanism permits the handlebars to be swung from an upward, or riding, position to a downward position, where they essentially rotate through a 180° arc to lie in a downwardly struck position somewhat in side-by-side relationship to the front wheel.

The bicycle also includes a rear wheel mounted on a rear wheel axle and which is rotated through a main sprocket located substantially in the area of the hinge pin. This main sprocket is capable of rotating the rear wheel through a sprocket on the rear wheel and which includes a chain trained around the main central sprocket and the sprocket on the rear wheel. In addition, pedal mechanisms are connected to the main sprocket for rotation by an individual riding the bicycle. The present invention also provides for a dual mid-sprocket arrangement as hereinafter described.

One of the aspects of the present invention is that the front wheel may be rotated through a 180° arc with respect to the column so that the front wheel actually projects rearwardly. Moreover, the front frame section of the bicycle may be folded with respect to the rear frame section about the hinge axis so that the front frame section and the rear frame section lie in a substantially parallel relationship. In this case, the front wheel will become aligned with the axle of the rear wheel, and these two may be locked together so that the bicycle may be rolled along the ground or other supporting surface. Consequently, it can be observed that the distance between the mid hinge axis and the front wheel, when rotated 180° with respect to the column, and the distance between the mid hinge axis and the rear wheel axle are approximately equal so that the two axles may lie in colinear relationship.

Another of the unique aspects of the present invention is that a mid hinge lock is located in the area of the main sprocket. In view of the above construction, a unique mid hinge lock design is not necessary, since the hinge lock was constrained to be in the region of the sprocket in order to retain the small size of the bicycle in the folded condition. This mid hinge lock is uniquely designed so that it is of the quick-opening type and can be operated with one hand. The mid hinge lock is uniquely designed to include a pair of spring type lock bar which always urge the lock into the locking position. A pin on the lock bar pushes a locking channel, or so-called "locking grab," into an unlocked position whenever the locking pin is set in a clockwise position and unlocked by the user thereof. In like manner, the locking grab becomes automatically engageable with the cooperating locking grab when the two frame sections are pushed to aligned position. The unique design of this mid hinge lock with the unique snap-type action of the mid lock permits a quick release mid lock which requires only one hand to operate, that is, to un-lock while unfolding the bicycle or to lock while folding the bicycle.

A pair of pedal crank arms, with pedals on the outer ends thereof, are connected to the main sprocket to rotate the main sprocket, and hence the rear wheel of the bicycle. In this case, one of the pedal crank arms is hingedly connected with respect to the main sprocket so that it can be rotated in a vertical direction approximately through a 180° arc. The crank arm is hingedly connected by a quick-release lock mechanism to the pedal sprocket. This hinge release lock mechanism is uniquely designed so that the crank arm can be spring-biased to either the up or the down position. A snap-action in this pedal crank arm lock provides for easy locking and unlocking of the crank arm and also provides for a "stay" for the crank arm when in the unfolded or pedalling position. Moreover, the locking mechanism is designed so that provides an almost infinite torque strength about the lock for the crank in the lower 50% of its pedalling cycle which is the major portion of the pedalling cycle.

A further aspect of the bicycle of the present invention is that the seat structure is comprised of a telescoping three-section seat post. Moreover, a cable is located within the three telescoping seat post sections which permits a seat on the upper end of one of the three seat post sections to be extended to the same positional relationship each time the seat is opened. This cable essentially limits the maximum amount of telescopic opening of the three seat post sections.

The bicycle of the present invention also uniquely features fenders constructed so that they are capable of being attached to the frame through snap fittings and like arrangements. Thus, the fenders may be easily and quickly attached and removed.

Many other features of the foldable bicycle are quite unique with respect to those bicycles known in the prior art, and these unique aspects are defined in more specific detail as hereinafter set forth in the Detailed Description of the invention. Nevertheless, it should be observed that this Detailed Description is only a detailed description of one embodiment of the present invention.

BRIEF DESCRIPTION OF THE DRAWINGS

Figure 1:
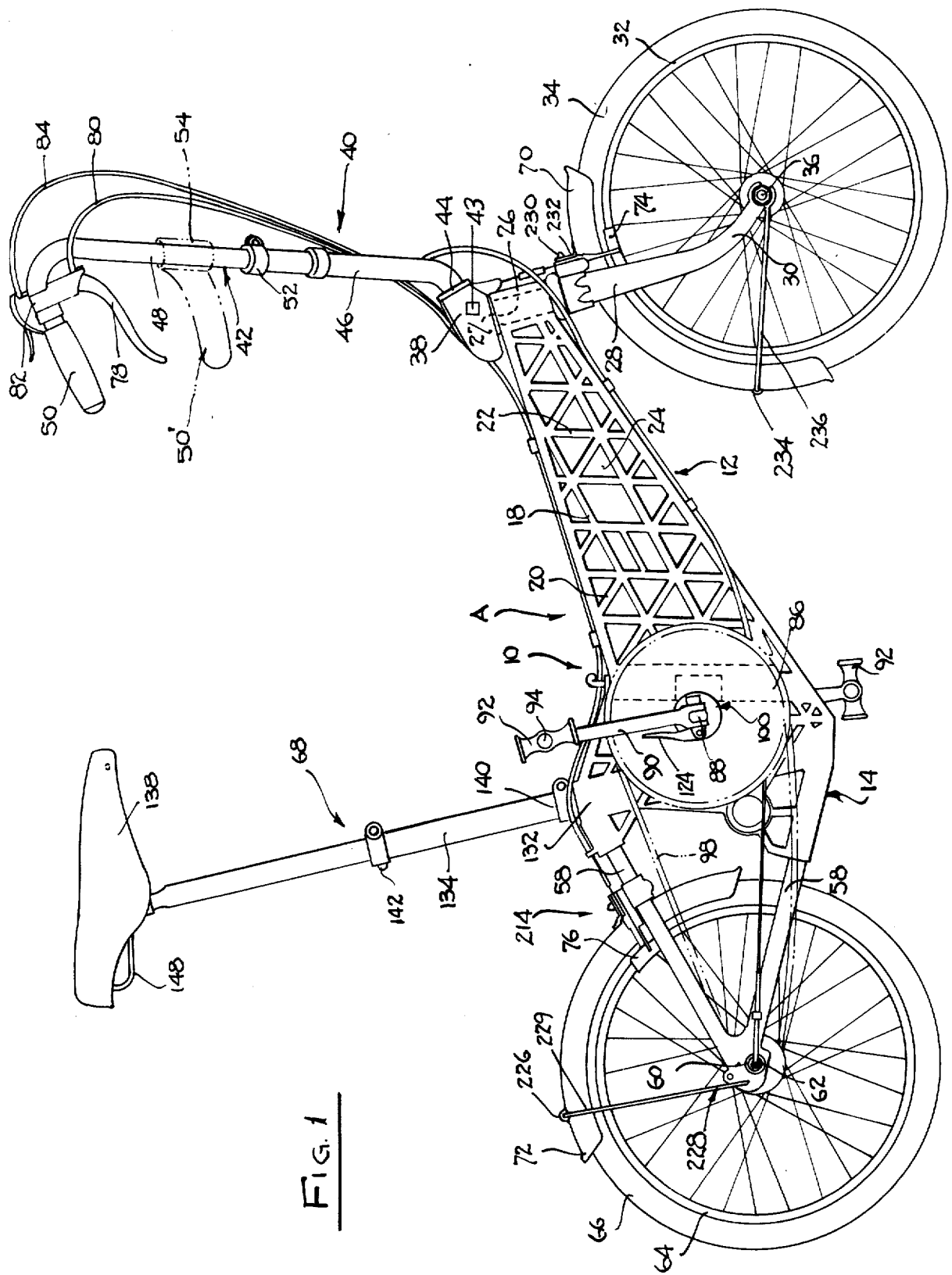
Figure 2:
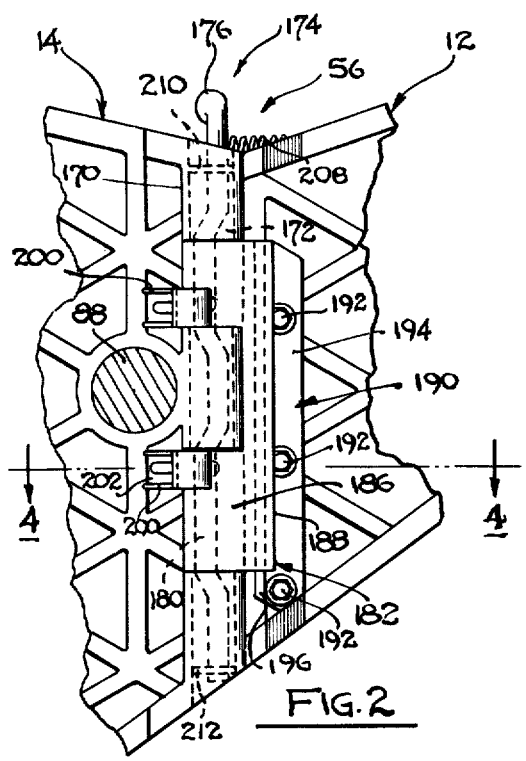
Figure 4:
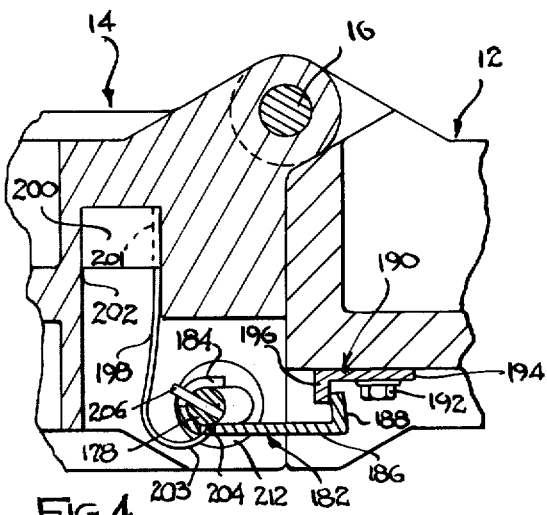
Figure 3:
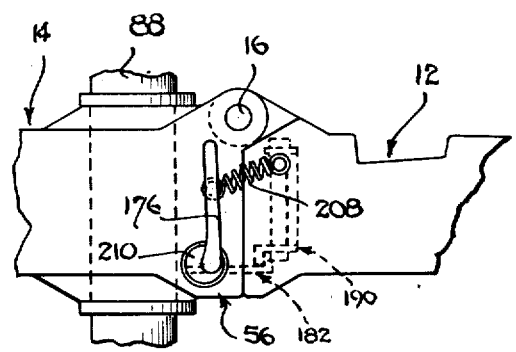
Figure 5:
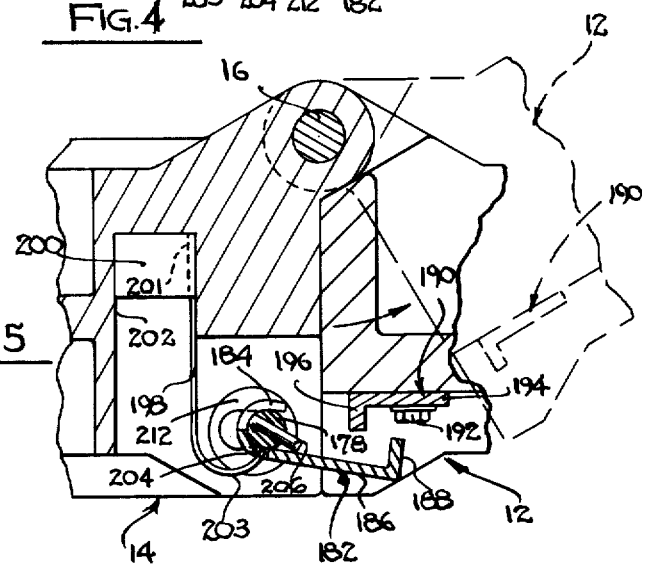
Figure 14:
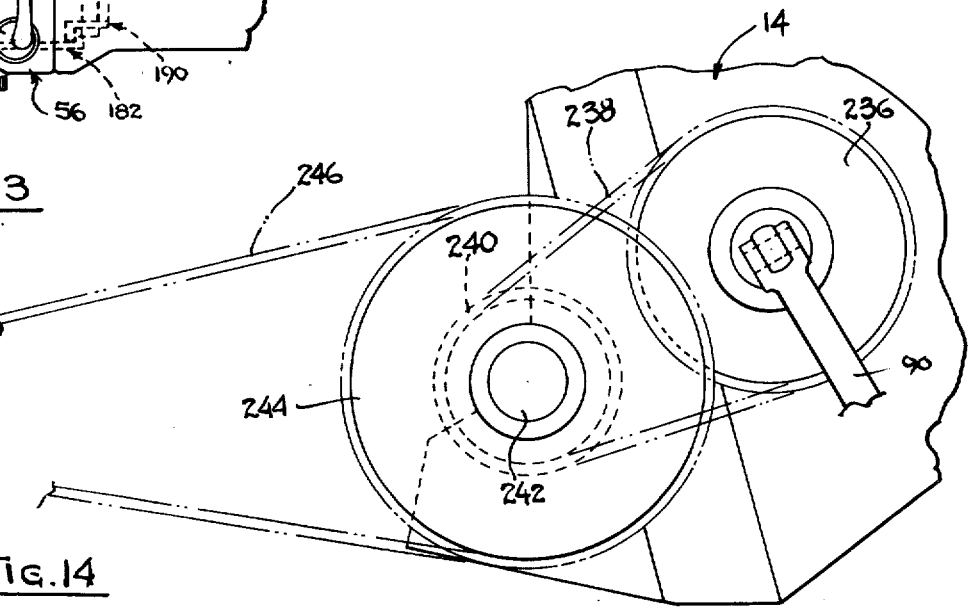

Having thus described the invention in general terms, reference will now be made to the accompanying drawings in which:

FIG. 1 is a side-elevational view of a foldable bicycle constructed in accordance with and embodying the present invention;

FIG. 2 is a side-elevational view of a main hinge section permitting the main frame of the bicycle to folded about a hinge axis;

FIG. 3 is a top plan view of the hinge section of FIG. 2;

FIG. 4 is a horizontal sectional view taken along line 4—4 of FIG. 2 and showing a portion of a hinge locking mechanism;

FIG. 5 is a horizontal sectional view, similar to FIG. 4, and showing the hinge locking mechanism in the opened position;

FIG. 6 is a somewhat schematic top plan view, showing the front and rear frame sections of the bicycle of FIG. 1, in the folded condition;

FIG. 7 is a side elevational view, partially broken away and in section, and showing a pedal crank arm locking mechanism;

FIG. 8 is a side elevational view, partially broken away and shown in section, and substantially taken along the plane 8—8 of FIG. 7;

FIG. 9 is a side elevational view, partially broken away and shown in section, and partially shown in phantom lines, of a collapsible seat structure for use with the bicycle of FIG. 1;

FIG. 10 is a somewhat horizontal sectional view taken along line 10—10 of FIG. 9, and showing one of the seat structure locking mechanisms;

FIG. 11 is a perspective view, partially broken away, and showing a portion of the hinge locking mechanism of FIGS. 2-5; and FIG. 12 is an exploded perspective view, showing some of the components of the hinge locking mechanism of FIG. 12 in their operative and cooperating relationship;

FIG. 13 is a fragmentary side elevational view, partially in section, and showing a fender attachment means forming part of the bicycle of the present invention; and FIG. 14 is a fragmentary side elevational view, partially shown in phantom lines, and illustrating a modified form of drive sprocket arrangement which may be used in the bicycle of the present invention.

DETAILED DESCRIPTION

Referring now in more detail and by reference characters to the drawings which illustrate practical embodiments of the present invention, A designates a foldable bicycle having a main frame 10 divided into a front frame section 12 and rear frame section 14. The front and rear frame sections 12 and 14 can be pivoted with respect to a central hinge having a hinge pin 16 (as illustrated in FIGS. 3-5 of the drawings).

The front frame section 12 is preferably formed of die casted aluminum, although other structurally sound and lightweight materials could be used, as for example, magnesium, or otherwise plastics including reinforced plastics, such as fiberglass-epoxy compositions. By reference to FIG. 1, it can be observed that the die-casted front frame section 12 includes a plurality of intersecting ribs, preferably a hexagonal pattern of ribs such as somewhat longitudinally extending parallel ribs 18 connected by a first set of parallel, diagonally extending cross-ribs 20 along with a second pair of essentially vertically extending cross-ribs 22. It can also be observed that these various diagonal ribs 18 and the various cross-ribs 20 and 22 are all integral with a central web 24.

There are several advantages in the bicycle of the present invention by virtue of utilizing a cast frame. Unlike a regular full-size bicycle, the smaller frame of the folding bike is further divisible into at least two constituent parts which are joined together at the mid hinge pivot defined by the pivot pin 16. The die cast frame of the present invention also allows for a minimum number of parts thereby reducing the complexity of the instant bicycle when compared to conventional prior art foldable bicycles. Consequently, quality control problems and like problems are reduced. In addition, the die cast frame also allows for proper strength-to-weight ratios within the constraints of the folding bicycle. In this respect, die-casting is generally more suitable for complex parts, with relatively high precision requirements.

It can also be observed that the main frame 10, as illustrated in FIG. 1, does not fully utilize the triangular structure common in full-size men's bicycles. Inasmuch as weight should be minimized as much as possible, the strength-to-weight ratio of the frame is vital, and the die-casted light alloy frame would generally provide a strength-to-weight ratio superior to conventional brazed tubing approaches and far more superior to bicycles which utilize a single strong steel tube structure. In addition, the elimination of quality welding and brazing processes substantially reduces the cost, as well as simplifies the problems in quality control of the final product.

Integrally formed with the forward end of the front frame section 12 is a tubular mounting boss 26, which serves as a front column, and which is provided with a rotatable column shaft 27, the latter being rotatably mounted within the boss 26. A pair of forks 28 are secured to and rotatable with the column shaft 27, as illustrated in FIGS. 1 and 6 of the drawings. The forks 28 are provided with arcuately shaped forwardly curved sections 30. A conventional wheel 32, preferably of sixteen inch diameter for small stress, is mounted on the outer end of the forks 30 and is provided with a form of pneumatic tire 34 in a conventional manner. Moreover, the wheel 32 is rotatably mounted with respect to the forks 30 by means of a front axle shaft 36. The shaft 36 would be suitably retained by means of locking nuts 37 provided with washers and conventional bearings, although other retaining means including end caps or the like could be used.

Mounted on the upper end of the column 26 is a mounting hub 38 which rotates with the forks 28, and hence the front wheel 32, and with respect to the column 26. Mounted on the hub 38 is a handle bar section 40 which comprises a pair of upwardly extending, outwardly diverging handle bar arms 42. Each of the handle bar arms 42 are mounted within the hub 38 by means of a quick-lock release mechanism 43, schematically illustrated in FIG. 1 of the drawings. In this way, each of the handle bar arms 42 can be pivoted through a sleeve 44 on the forward end of the hub 38, in the manner as illustrated in FIG. 1. Thus, when it is desired to collapse the bicycle A, the right-hand handle bar 42 is swung downwardly toward the right side of the front wheel 32 and the left-hand handle bar arm 42 is similarly swung downwardly toward the left side of the wheel 32, after the wheel has been rotated through a 180° arc in a manner to be hereinafter described in more detail. This quick-lock release mechanism mentioned above may be designed to either hold the handle bars rigidly locked in their extended position, as well as in the collapsed position. Each of the handlebar arms 42 are telescopically constructed so that each of the arms 42 comprises a base tube 46 and a telescopically extendible tube 48, with the latter tube 48 carrying hand grips 50. Moreover, the tubes 46 and 48 are provided with an ordinary lock mechanism 52, such as a screw or a bolt-type lock mechanism, such that the tube 48 may be occasionally extended and telescopically collapsed within the tube 46.

If desired, the handlebar arms 42 could be constructed so that the hand grips 50 are lower than illustrated and projected rearwardly in a curved fashion, as represented by reference numeral 50' and as illustrated in phantom lines in FIG. 1. This latter form of hand grip 50' can be secured to the arms by means of a sleeve 54. This construction renders a racing type appearance to the bicycle. In like manner, if desired, the handlebar arms 42 could be constructed to include both types of hand grips.

The rear frame section 14 is hingedly connected to the front frame section 12 at the hinge pin 16, as previously described. A quick-lock release mechanism 56 (often referred to as a "hinge locking mechanism" or a so-called "mid-lock") is provided for holding the two frame sections 12 and 14 in their essentially coplanar relationship, that is, the opened condition, as illustrated in FIG. 1. The rear frame section 14 is comprised of two pairs of upper and lower transversely spaced apart rearwardly extending frame tubes 58 (FIG. 6), and diverging outwardly in plane parallel to the length of the bicycle. These upper and lower pair of frame tubes 58 also converge vertically toward one another and thereby form a pair of transversely aligned enlarged mounting flanges 60 at their rearward ends. The flanges 60 are designed to carry a rear axle shaft 62 which, in turn, retains a rear wheel 64. The axle shaft 62 may also be retained by locking nuts 63 or the like. The rear wheel 64 carries a pneumatic tire 66 in the conventional construction.

The bicycle A is also suitably provided with an extendible seat section 68 and which is more fully described in detail hereinafter. In like manner, the bicycle A would be conveniently provided with front and rear fenders 70 and 72, respectively. In this case, the fenders 70 and 72 could be formed of a suitable synthetic plastic material which may be molded or thermo-formed, or otherwise could be formed of a lightweight metal. Moreover, the fenders 70 and 72 could be easily and removably detached from the bicycle by means of snap fittings or the like in a manner to be hereinafter described in more detail.

The bicycle would also be suitably provided with caliper brakes or so-called "hand-brakes" which have pads and which have the typical C-shaped brackets and braking pads 74 and 76 mounted on the front and rear wheels 32 and 64, respectively.

The caliper brakes are operated by means of hand brake lever arms 78 which are mounted in close proximity to the hand grips 50 and are connected to the caliper brakes by means of cables 80. In this respect, one such lever arm 78 is connected to the rear wheel 64 through a cable 80 and an opposite lever arm 78 in proximity to the opposite hand grip 50 would be connected to the front wheel 32.

The bicycle A may also be conventionally provided with a conventional multi-speed bicycle transmission (not shown) which is operated through a gear shift lever 82 and the latter of which is also similarly mounted in close proximity to one of the hand grips 50. The gear shift lever 82 is connected through a shift cable 84 to the bicycle transmission which may be located at the rear wheel. This transmission arrangement is essentially conventional in its construction, and is therefore neither illustrated nor described in any further detail herein. A main pedal sprocket 86 is mounted on the frame 10 in close proximity to the hinge pin 16 and the hinge locking mechanism 56 and extends longitudinally beyond both the hinge pin 16 and the main locking mechanism 56.

The sprocket 86 is mounted on a sprocket shaft 88 and is rotated by a pair of oppositely extending pedal crank arms 90 but which lie in essentially parallel planes in space. Each of the pedal crank arms 90 are provided at their outermost ends with conventional foot receiving pedals 92 which are mounted thereon through pivot pins 94. The main sprocket 86 is connected to a rear-wheel sprocket 96 through a sprocket chain 98, and which rear-wheel sprocket 96 is mounted on the rear axle shaft 62, in the manner as illustrated in FIG. 6. The sprocket chain 98 co-acts with the rear-wheel sprocket 96 and the main sprocket 86 by means of teeth on the peripheral surfaces of these sprockets 86 and 96, although the teeth have not been illustrated in order to maintain clarity in the drawings.

The crank arms 90 are normally located with respect to the sprocket shaft 88 in such manner that one of the crank arms extends in a direction which is diametrally opposed to the direction of the other of the crank arms. However, in order to fold the bicycle in its compact condition, one of the crank arms 90, such as the right-hand crank arms, can be folded upwardly to its uppermost position, as illustrated in FIGS. 7 and 8 of the drawings. In this case, it can be observed that the pedals 92 on each of the crank arms 90 normally extend transversely outwardly from the bicycle A. When one of the crank arms is rotated through a 90° arc so that it extends upwardly, this crank arm 90 is coparallel with the other non-pivotal crank arm 90. In addition, the pedal 92 on the pivotal crank arm 90 would be located in a position where it extends inwardly with respect to the main frame 10 when the crank arm is pivoted upwardly. One of the crank arms 90 is therefore provided with a crank arm locking mechanism 100, of the quick release type, which is more fully illustrated in FIGS. 7 and 8 of the drawings. This crank arm locking mechanism 100 is hereinafter described in more detail.

One of the unique aspects of the present invention is that the foldable bicycle A can be folded into a relatively small compact unit by first rotating the front wheel with respect to the column 27 through a 180° arc so that the front wheel 32 is essentially reversed in its position. In this way, the front edge of the fender 70 would be projected rearwardly, and the arcuate sections 30 of the forks 28 would similarly project rearwardly. Thereafter, the quick-lock mechanism associated with the hub 38 would be actuated so that the handle bar arm section 40, including the two arm sections, could be shifted downwardly in essentially coplanar relationship with the front wheel 32.

After the front wheel 32 has been rotated 180° with respect to the column 26, and after the handlebar sections 40 have been collapsed and folded down, the mid hinge lock 56 is released so that the front frame section 12 can be swung rearwardly through approximately a 180° arc about the main hinge pin 16. In this case, the front frame section 12 will become essentially parallel with the rear frame section 14 and assume the position as illustrated in FIG. 6 of the drawings. It can be observed that the front wheel 32 has been rotated through the 180° arc with respect to the column 26 and, moreover, due to the fact that the front wheel has been so rotated, the front axle 36 is essentially colinear with the rear axle 62.

The front axle is provided on its left-hand side (when in the opened riding condition) with an adjustable locking sleeve 102, which accommodates an extension 104 on the rear axle 62 and which are retained in a locking engagement by means of a mid lock spring as hereinafter described in more detail. If desired, a knurled thumb screw or the like could be used to lock the front axle 36 and the rear axle 62 in colinear relationship. It can be observed that inasmuch as the front axle 36 and the rear axle 62 are aligned in the folded condition, the bicycle not only assumes a relatively small compact unit, but that the tire 34 on the front wheel 32 and the tire 66 on the rear wheel 64 may be rolled along the ground or other supporting surface in this folded condition. If desired, the front fender 70 and the rear fender 72 may be removed through their retention on the bicycle by means of snap-fittings as hereinafter described.

The unique design of the bicycle A is such that the front wheel 32 may be rotated through a 180° arc and thereafter the front frame 12 may be rotated through essentially a 180° arc through the hinge pin 16 so that the front axle 36 and the rear axle 62 may become aligned. In this respect, it can be observed that the distance between the hinge pin 16 and the front axle 36, after the front wheel 32 has been rotated through a 180° arc so that it projects rearwardly, is equal to the distance between the hinge pin 16 and the rear axle 62.

The crank arm locking mechanism 100 for shifting one of the crank arms 90 through a 180° arc is more fully illustrated in FIGS. 7 and 8 of the drawings. In this case, it can be observed that the sprocket shaft 88 is provided with a somewhat rectangularly shaped outer end 108 having a pair of opposed flat walls 109 with the sprocket 86 retained on a symmetrical portion of the shaft 88 and the crank arms 90 retained on the outer end 108 as described in more detail hereafter. The crank arm 90 is provided with a bifurcated upper end 110 defined by a pair of flanges 112 having inwardly presented flat walls which engage the flat walls 109. Moreover, the crank arm locking mechanism 100 includes a pin 114 extending through the flanges 112 of the bifurcated upper end 110 and also through the outer end 108 of the main sprocket shaft 88. This pin 114 is retained on its inner end by means of a knurled nut 116 and at its outer end by a lever arm 118, the latter of which is retained on the pin 114 through a bifurcated bracket 120 and a pintle 122, in the manner as illustrated in FIG. 7 and FIG. 8 of the drawings. The lever arm 118 is provided with a camming surface 124 which bears against one of the flanges 112, in the manner as illustrated in FIG. 8. A leaf spring 126 (FIG. 7) is located on the outer cylindrical portion of the main sprocket 86. It can be observed that when the lever arm 118 is in the locked position, that is the position in FIGS. 6 and 7, the camming surface 124 bears against one flange 112 and actually locks the arm 90 against rotation relative to the shaft 88.

When it is desired to release the crank arm 90 for rotation thereof in a 180° arc with respect to the main sprocket shaft 88, the lever arm is pulled upwardly in the direction of the arrow in FIG. 8 and, in this respect, the camming surface 124 will be released from its bearing engagement against one of the flanges 112 of the bifurcated upper end 110. This action will cause the leaf spring 126 to compress slightly upon rotation of the crank arm 90 with respect to the main sprocket shaft 88. As this one crank arm 90 is released with respect to the main sprocket shaft 88, the crank arm 90 can be shifted upwardly to a position as illustrated in phantom lines in FIGS. 7 and 8 of the drawings. In the normal riding position of the bicycle, this latter crank arm 90 is illustrated in the solid lines of FIGS. 7 and 8. In this case, the pivotal crank arm 90 is illustrated in the upper position or unfolded position in FIG. 1, whereas this same crank arm is illustrated in the lower position or unfolded position in FIGS. 7 and 9, it being understood that in either position, this particular crank arm can be folded through a 180° arc to a position where it is coparallel to the opposite crank arm.

It can be observed that if the right crank arm 90, as illustrated in the solid lines in FIGS. 7 and 8, were in its lowermost position, the opposite crank arm 90 would be in its uppermost position. Consequently, by actuating the quick-lock release mechanism 100, the right crank arm 90 can also be rotated to its uppermost position (illustrated in phantom lines in FIGS. 7 and 8) so that each of the crank arms 90 are parallel in space. Thus, when the front frame 12 is rotated through a 180° arc, both of the crank arms 90 are parallel in space. However, in the preferred aspect of the invention, the two crank arms 90 would preferably be located so that they are disposed in their uppermost position. In this way, the pedals on the folded crank arm extends inwardly with respect to the two frame sections 12 and 14 when the latter are in the open position. The pedal 92 on the non-foldable crank arm 90 still extends outwardly but in the same direction as the pedal on the foldable crank arm 90. Nevertheless, when the two frame sections 12 and 14 are folded about the mid hinge pin 16, both pedals 92 effectively on the rear frame section 14 will project inwardly with respect to the folded frame sections 12 and 14 in order to prevent any obstruction on the folded bicycle when in its folded condition.

The leaf spring 126, which also effectively serves as a washer, urges the crank arm 90 to be either in the upper or the lower position, that is, in the folded or the unfolded condition. This leaf spring 126 will thus provide a snap action which makes it very convenient and easy to fold and unfold the lever arm 90. In addition, this quick-lock release mechanism 100, in combination with the leaf spring 126, also provides a "stay" for the crank arm 90 when it is in the folded or up position.

A pair of adjustable set screws 128 and 130, as illustrated in FIG. 7 of the drawings, defines the downward position, that is the unfolded position of the foldable crank arm, by means of the screws 128 and 130 abutting against each other. In this respect, the set screw 128 may serve as a keeper to abut against and lock the adjustment screw 130. This construction provides an almost infinite torque strength (about the lock mechanism) for the crank in the lower fifty percent of its pedalling cycle. Inasmuch as the normal pedalling force is applied in the upper fifty percent of the cycle, the quicklock release mechanism 100 provides adequate torque rigidity.

The extendible seat section 68 is more fully illustrated in FIG. 9 and 10 of the drawings. In this case, the extendible seat section 68 includes a main hollow tube 132 formed in the rear section 14 as is more fully illustrated in FIGS. 1 and 9 of the drawings. Extendible within the tube 132 in a telescopically oriented arrangement is an intermediate tube 134 and similarly telescopically extendible within the upper end of the tube 132 is an uppermost tube 136 which carries, at its upper end, a conventional seat structure 138. The tube 134 may retract within the tube 132 and extend outwardly therefrom by means of the action of a quick-lock release mechanism 140. In like manner, the tube 136 may retrack within and extend outwardly of the tube 134 through a similar quick-lock release mechanism 142. These quick-lock release mechanisms 140 and 412 are substantially similar in construction and are more fully illustrated in FIG. 10 of the drawings, and in addition, these mechanisms will be described in more detail hereinafter. Nevertheless, it can be observed that while only two such telescopically extendible tubes, namely the tubes 134 and 136, are illustrated as extending within the main tube 132 on the rear frame 14, any number of tubes may be employed in connection with the present invention.

Located within the various tubes 132, 134 and 136 is a size regulating cable 144 which is secured within the tube 134 by means of a retaining block, or so-called "keeper", 146. The block 146 can be formed of a hard rubber cork material which may be jammed tightly into the tube 134. In this way, the cable 144 is fixedly located in its position within the tube 132. Moreover, the upper end of the cable 144 is physically retained with respect to a somewhat tubular arm 148 on the underside of the seat 138 by means of a locking sleeve 150, in the manner as illustrated in FIG. 9 of the drawings. This locking sleeve 150 is provided with a set screw 152 so that the length of the cable 144 between the keeper 146 and the locking sleeve 150 may be adjusted as desired by releasing and retightening the set screw 152. Moreover, the lower end of the cable 144 is secured to the frame and rigidly retained by means of a bracket 154 as illustrated in FIG. 9 of the drawings.

By means of the above-outlined construction, it can be observed that the seat 138 can be retracted to its collapsed position, as illustrated by the phantom lines in FIG. 9 and as designated by reference numeral 138', upon opening of the quick-lock release mechanisms 140 and 142. In this case, the cable 144 will collapse within the respective tubes. However, the cable 144 will not extend beyond the retaining block 146 and thereby will not interfere with the rolling of the bicycle along the floor or other supporting surface. Moreover, it can be observed that inasmuch as the cable 144 is fixed at its lower end by means of the bracket 154 and its upper end by means of the locking sleeve 150, the telescopically opening seat structure 68 can always open to the exact position as it was before collapsing.

If the user of the bicycle A should desire to extend the size of the telescopic column or otherwise reduce the column size, it is very convenient and easy to merely adjust the upper end and/or lower end of the cable 144 by releasing the locking sleeve 150 and/or the retaining bracket 154 and pulling, or otherwise releasing the cable 144. In this same connection, an extra amount of the cable 144 may be provided for purposes of extending the telescopic column beyond that as illustrated with respect to the proportional relationship of the other components of the bicycle. This extra amount of cable could be very conveniently wrapped around the tubular arm 149 on the underside of the seat 138.

One of the main problems existing in foldable bicycles in order to achieve a miniaturization size is the seat structure. The present invention overcomes this problem by using a telescopic, three-sectioned seat post in place of the conventional two-sectioned seat post, and in addition by avoiding termination of the seat post in relationship to the sprocket of the bicycle. This construction allows the collapsed seat post to extend toward the ground.

The cable 144 in this connection is preferably a synthetic fibrous material cable, such as a nylon cable, and is situated inside of the tubings and is affixed at three points, that is the cable 144 is affixed at two points exteriorly of the telescopic sections and retained at one point within the tube 134, as illustrated in FIG. 9 of the drawings. In this case, it can be observed that the cable actually extends beyond the retaining block 146 and terminates at its lower end outside of the lower tube section 132 and is retained by means of a bracket and set screw arrangement 154. Consequently, it can be observed that the cable 144 is retained at the bracket 154, the retaining block 146 and by means of the locking sleeve 150. By adjusting the position of the cable 144 with respect to its terminal ends at the locking sleeve 150 and at the retaining bracket 154, the length of the cable 144 is adjusted relative to the retaining block 146, thereby providing a means of adjusting the overall seat height.

In accordance with the above, it can be observed that telescopic tubes 134 and 136 can be extended outwardly of the tube 132 to an exact height. In this way, in the act of unfolding, the user merely needs to pull the seat to its maximum extent, which is controlled by the cable 144, and the sections will automatically adjust to their correct position and height. Thereafter, the user of the bicycle A can lock the two quick-release lock mechanisms 140 and 142, as illustrated in FIG. 9 of the drawings.

Inasmuch as the quick-lock release mechanisms 140 and 142 are substantially identical, one of these mechanisms 142 is more fully illustrated in FIG. 10 of the drawings; although it should be understood that the quick-lock release mechanism 140 is substantially identical in construction.

The seat structure quick-lock release mechanism 142 is essentially conventional in its construction and, in this case, comprises a C-shaped clamp 155, which includes a pair of spaced apart terminal ends 156 accommodating a locking pin 158. At one end, the pin 158 is provided with a knurled locking nut 160, and at its other end, the pin 158 carries a lever arm 162 which is retained thereon by means of a set screw 164. The lever arm 162 includes a camming surface 167 and a flat surface 168, the camming surface 167 being capable of bearing against the outer flat surface of one of the legs 156 of the clamp 155 to provide a clamping action, as illustrated by the position of the arm 163 (in the solid lines in FIG. 10). It can be observed by further reference to FIG. 10 of the drawings that the tube 136 is fixedly retained in radial orientation with respect to the tube 134 by means of a set screw 166 in the tube 134 moving in a corresponding slot in the tube 136.

Thus, when it is desired to release the quick-lock release mechanism 140, it is only necessary to rotate the crank handle 162 through approximately a 90° arc to the position as illustrated by phantom lines in FIG. 10, in order to release the clamping action resulting through the C-shaped clamp 155. In this case, the tube 134 will then be free to extend within the tube 132. Moreover, by rotating the lever 162 to its locking position, as illustrated in FIG. 10 of the drawings, it is thereby possible to lock the seat section telescopically enclosed within the tube 132 and retain the same therein.

The locking mechanism 140 operates in substantially the identical manner and, in this way, the post 134 can be telescopically extended within the tube 132 and retracted therefrom in the same manner. Nevertheless, it can always be observed that the seat 138 will always achieve the desired same physical orientation with respect to the remaining components of the bicycle A upon opening of the bicycle A from its folded condition, inasmuch as the cable 144 is restrained in several positions, and will automatically limit the amount of opening movement of the telescopic sections.

As indicated above, one of the major problems to be overcome in the miniaturization of a folded bicycle resided in collapsing of the seat structure. As also stated, the present invention overcomes these problems by using the telescopic three-sectioned seat post instead of the normal two-sectioned seat post and also provides a seat post which does not terminate at the sprocket when in the collapsed position. Since the cable 144 is fixed at the three spots, by adjusting the two end positions relative to the retaining block 146, the user thereof merely pulls the seat to its maximum extent in the act of unfolding the bicycle, and the three telescopic sections will automatically assume their correct positional relationships.

It can be observed that the mid lock 56 is located in the region of the mid hinge pin 16, and, in addition, is located in the region of the main sprocket 86. Moreover, by reference to FIG. 1, it can be observed that the sprocket 86 extends beyond the mid lock 56, both forwardly and rearwardly thereof, posing unusual special constraints on the design of the mid lock 56. In the existing foldable bicycle structures, the mid lock is located forwardly of the sprocket to avoid both design and operating complexities in the region of the sprocket. Consequently, the present invention provides a unique form of mid lock 56 which is not only strong and reliable, but convenient in its operation. This mid lock 56 is also designed as a quick-release lock and requires only one hand to operate the mid lock; that is, one hand can unlock the mid lock 56, while the other hand holds the bicycle, or otherwise, it can be locked while folding the bicycle or unfolding the bicycle with one hand.

The mid lock 56 is more fully illustrated in FIGS. 2-5 and 11 and 12 of the drawings. A pair of cylindrically shaped rearwardly projecting bosses 170 are formed on the front frame section 12 and a forwardly projecting boss 171 on the rear frame section 14 is aligned with the bosses forming three individual mid lock bosses and each are provided with aligned vertical bores 172, as illustrated in FIG. 2 of the drawings. As an alternate embodiment, hardened alloy tubes comprising the projecting bosses 170 and 171 could be brazed or welded to the frame sections 12 and 14, respectively, as desired, to comprise these three individual sections to form the vertical bores 172. By reference to FIG. 2, it can be observed that the bores in the bosses 170 and 171 constitute a vertically extending and centrally aligned tubular bore 172 which accommodates a locking pin 174 having an upper handle 176. The locking pin 174 also includes a main shank 178 which is provided with a pair of vertically spaced apart, diametrally outwardly projecting offset portions 180, in the manner as more fully illustrated in FIGS. 2 and 12 of the drawings.

A first locking channel 182 is secured adjacent the main tubular bore 172 to the rear frame section 14, and includes an arcuate section 184 which is sized to accommodate the off-set portions 180 of the pin 174. The arcuate section 184 extends through a flat wall 186 forming part of the channel 182 and terminates in an inwardly projected locking flange 188. In this respect, it can be observed by reference to FIGS. 4 and 5 that the locking flange 188 is located at a slightly acute angle with respect to the flat plate section 186 and thus is angulated somewhat rearwardly with respect to the bicycle.

A similar locking channel 190 is secured to the front frame section 12 by means of bolts 192 and includes a flat plate 194 and an outwardly projected locking flange 196, as illustrated in FIG. 4 of the drawings. In this case, it can be observed that the locking flange 196 is perpendicular to the plate 194, although it could be located at a slightly acute angle with the plate 194, that is, so that it is angulated slightly forwardly with respect to the bicycle. A pair of retaining clips 198 are secured to the rear frame section 14 and include pairs of horizontally disposed retaining flanges 200, each having terminal projecting ends 201 for insertion into apertures 202 formed within the rear frame section 14. The retaining clips 198 also include arcuately shaped spring-acting fingers 203 having reduced projecting tabs 204 which extend into and are retained in apertures 205 formed within the flat wall 186 of the channel 182 as best seen in FIGS. 4, 5 and 12.

The locking pin 174 also includes a pair of vertically disposed outwardly extending camming pins 206 which extend through vertically located slots 207 formed in the channel 182. These camming pins 206 are also located to engage the flat wall 186 forming part of the locking channel 182. In this way, the camming pins 206 can engage the flat wall 186 and urge the locking channel 182 outwardly to permit folding of the bicycle in a manner as hereinafter described.

By further reference to FIGS. 2-5 and 11 and 12 of the drawings, it can be observed that an upper camming disc 210 and a lower camming disc 212 are also retained on the locking pin 174. These camming discs 210 and 212 also cooperate with the offset portions 180 to create an initial forward movement of the locking flange 188 with respect to the locking flange 196. By reference to FIG. 12, it can be observed that the camming discs 210 and 212 are eccentrically located on the shaft 178 of the locking pin 174 to create this camming action.

When it is desired to open the mid lock 56, the user of the bicycle merely engages the handle 176 of the locking pin 174 and rotates the same in a clockwise direction, reference being made to FIG. 3 of the drawings.

As this occurs, the offset portions 180 on the pin 174 will initially bear against the arcuately shaped sections 184 of the channel 182 and will initially cause axial displacement thereof. The major part of the axial displacement, that is the forward shifting movement of the locking channel 182 with respect to the locking channel 190, results from the camming pins 210 and 212 bearing against the portions of the frame 12 in which they are retained, see for example, FIG. 11. As the cams 210 and 212 rotate, they will shift the vertical axis of the locking pin 174 forwardly as illustrated in FIG. 5 of the drawings. The locking flange 188 will then become disengaged from the locking flange 196 of the locking channel 190. It can be observed in accordance with FIG. 4 of the drawings, that the locking mechanism is located so that the two locking flanges 188 and 196 are in contact with each other, thereby preventing the front frame section 12 from being pivoted about the mid pivot pin 16. However, when the locking pin 174 is rotated, as for example, to the position illustrated in FIG. 5, the camming pins 206 will engage the flat wall 186 and shift the locking channel outwardly so that the locking flange 188 will become disengaged from the locking flange 196.

In this respect, it can also be observed that a two-axis movement of the locking channel 182 results in such manner that the cams 210 and 212 and the locking pin 174, in combination with the camming pins 206, cause the locking channel to shift forwardly to assume the position as illustrated in FIG. 5 of the drawings. The camming pins 206 will then rotate with the locking pin 174 until they engage the flat wall 186 of the locking channel 182 and bias the same outwardly. Thus, not only does the locking flange 188 extend transversely away from the locking flange 196, but the locking flange 188 also extends somewhat forwardly for a slight distance from the locking flange 196 as best seen in FIGS. 4 and 5 of the drawings. In the same respect, it should also be observed that when the locking pin 174 is rotated, it is at least partially rotated against the action of the retaining clips 198, inasmuch as the locking fingers 203 tend to bias the channel 182 toward its locking position, as illustrated in FIG. 4 of the drawings.

An extension spring 208 is connected between the front and rear frame sections in the manner as illustrated in FIG. 3 of the drawings. In this respect, it can be observed that the spring 208 tends to restrain the two frame sections 12 and 14 from being folded, as illustrated in FIG. 3 of the drawings, since a folding action would initially cause extension of the spring 208. Nevertheless, it can also be observed that the spring 208 is so located so that when the front frame section is swung approximately 180° with respect to the rear frame section 14, or vice versa, so that the two frame sections 12 and 14 are folded, the spring 208 will tend to hold the two frame sections in the folded condition.

The tube section 170 may be a press-fitted hard sheet tubing which is utilized in order to optimize the strength-to-weight ratio. In addition, a simple spring, such as the spring 208, provides a snap action to the mid hinge area in order to facilitate the acts of folding and unfolding. The pairs of locking channels 182 and 190 are always urged to a locking position, that is, they are biased to urge the locking channels 182 and 190 into the locked position, since the locking flange is angulated rearwardly and thus prevents separation until the two channels 182 and 190 are separated. In this respect, it can be observed that the locking channel 182 is essentially biased into a counter-clockwise direction when examining FIGS. 3–5 of the drawings. The camming action of the camming discs 210 and 212 in combination with the camming pins 206 essentially urge a clockwise rotation of the locking channel 182 in order to achieve an unlocked position. As indicated above, this action comprises an initial forward shifting movement of the locking flange 188 with respect to the locking flange 178. This forward movement is caused by the camming discs 210 and 212 bearing against the frame to cause a forward shifting movement of the locking pin and hence the locking channel 182, as previously described. Thereafter, the camming pins 208 cause the outward movement of the flange 188 with respect to the locking flange 196. In accordance with this construction, the quick-release mid-lock 56 requires only one hand to operate, that is to lock while unfolding the bicycle or to unlock while folding the bicycle.

FIG. 13 more fully illustrates the technique of connecting the removable fenders to the frame of the bicycle. In this case, the rear fender 72 of the bicycle is illustrated, as well as a mechanism 214 which forms part of the conventional wheel-braking mechanism. It can be observed that the mechanism 214 includes a clamp 216 which is secured to a rod 218 forming part of the rear frame section. Moreover, the clamp 216 is provided with an outwardly extending locking pin 220 having an enlarged locking head 222. It can also be observed that the locking pin 220 and the locking head 222 extend through a flange 224 secured to or otherwise integral with the fender 72 and having an aperture to accommodate the pin 220. The locking head 222 is somewhat resilient so as to removably snap-fit through the aperture in the flange 224.

Referring again to FIG. 1, it can be observed that the rear fender 72 is also provided with a retaining clip 226, the latter of which is rigidly secured to the fender 72. A brace 228 having a pair of transversely disposed, essentially parallel legs 229 formed of a somewhat resilient material is retained by the brace 228 and the parallel legs 229 have lower inwardly struck tabs (not shown) which extend into apertures formed within the rear frame section, in the manner as illustrated in FIG. 1. Since the brace 228 is resilient, the lower tabs snap-fit into the apertures and will be retained therein until forcibly pulled out.

The technique for locking the front fender 70 to the front frame section is also similar. In this case, it can be observed that a locking pin 230 extends outwardly from the front frame and extends through a flange 232 integral with, or otherwise secured to, the front fender 70. In like manner, a brace 234, similar to the brace 228, is also secured to the front fender 70 and is locked to the column 28, in the manner as illustrated.

FIG. 14 more fully illustrates a modified form of mid-sprocket mechanism which may be used in the foldable bicycle of the present invention. In this case, the mid-sprocket mechanism is designed to preserve the overall gear ratio, that is the distance travelled by the bike per revolution of the crank. Typically, for a single-speeder and three-speeder, the front sprocket must have at least 52 teeth, with the hind sprocket having no more than 11 teeth. There is mechanical difficulty in reducing the hind sprocket teeth number below eleven to any substantial amount. The number of teeth on the front sprocket, on the other hand, cannot be increased without also increasing the sprocket diameter, and thereby increasing the folded size of the bicycle.

Accordingly, the present invention provides a double mid-sprocket mechanism which is more fully illustrated in FIG. 14. In this case, the mid-sprocket mechanism includes a small-diameter sprocket 236 mounted on the rear frame section 14, and is operable by the pedal crank arm 90. The smaller-diameter sprocket 236 includes a chain or similar drive cable 238 which is also trained around a connecting sprocket 240 of relatively small diameter, that is a diameter smaller than the sprocket 236, and which is mounted on a shaft 242, the latter of which is also mounted on the rear frame section 14. Similarly mounted on the shaft 242, and being rotatable with the sprocket 240, is a large diameter sprocket 244. In this case, the large diameter sprocket 244 has a diameter which is larger than the diameter of the sprocket 236. Moreover, a chain or similar drive pulling mechanism 246 is thereupon trained around the rear or hind sprocket which drives the rear wheel 64.

It should be observed in connection with the present invention that the frame design allows the option of either a single or a double front sprocket. Thus, this unique design provides the advantages of a smaller front sprocket that in turn reduces the folding size of the bicycle, and a stepped-up gear ratio which permits the use of standard gearing in the rear wheel.

Thus there has been illustrated and described a unique and novel foldable bicycle which can be collapsed to a minimum size without sacrificing strength-to-weight ratio and which therefore fulfills all of the objects and advantages sought therefor. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention which is limited only by the following claims

Having thus described my invention, what I desire to claim and secure by letters patent is:

1. A foldable-type bicycle comprising:
   a. a front frame section,
   b. a rear frame section,
   c. hinge means hingedly connecting said front frame section to said rear frame section through a hinge axis,
   d. rear axle means for retaining a rear wheel on said rear frame section,
   e. a column on said front frame section and being pivotal on a column axis with respect to said front frame section,
   f. front axle means for retaining a front wheel on said front frame section,
   g. said front axle means being spaced forwardly of said column axis and said front wheel capable of being rotated about said column axis so that said front axle means is spaced rearwardly of said column axis and being spaced from said hinge axis by a distance approximately equal to the distance from said hinge axis to said rear axle means,
   h. said front frame section being pivotal about said hinge means so that said rear axle means is essentially colinear with said front axle means, and
   i. cooperating locking means on said front axle means and rear axle means to releasably lock said front and rear axle means in their essentially colinear relationship.

2. The foldable-type bicycle of claim 1 further characterized in that said front wheel is rotated about an 180° arc to space said front axle means rearwardly of said column axis, and said front frame section is pivotal about an approximately 180° arc so that said front and rear frame sections are somewhat parallel to each other in side-by-side relationship.

3. The foldable-type bicycle of claim 1 further characterized in that said bicycle comprises locking means for rigidly, but releasably, retaining said front frame section and said rear frame section in generally coparallel relationship.

4. The foldable-type bicycle of claim 1 further characterized in that a pair of handlebar sections are pivotally secured to said column and swingable from an upright position on opposite sides of said column to a position where they are swung downwardly on opposite sides of said column.

5. The foldable-type bicycle of claim 4 further characterized in that a pair of hand-grip sections extend rearwardly from said handlebar sections to be gripped by the rider of the bicycle.

6. The foldable-type bicycle of claim 4 further characterized in that a pair of racing-type hand-grip sections extend forwardly from said handlebar sections to be gripped by the rider of the bicycle.

7. The foldable-type bicycle of claim 4 further characterized in that handlebar locking means is provided for releasably locking said handlebar sections in said upright position.

8. The foldable-type bicycle of claim 1 further characterized in that an extendible seat member is operatively mounted on one of said front or rear frame sections for shiftable movement from an upright position to a lower position.

9. The foldable-type bicycle of claim 1 further characterized in that said front frame section comprises a cast aluminum member extending approximately between said column and said hinge means.

10. A foldable-type bicycle comprising:
  a. a front frame section,
  b. a rear frame section,
  c. front and rear wheels respectively mounted on said front and rear frame sections,
  d. hinge means hingedly connecting said front and rear frame sections,
  e. locking means for rigidly but releasably connecting said front and rear frame sections in substantially parallel alignment and being released so that one of said frame sections can be swung with respect to the other of the sections in order to fold said bicycle,
  f. a main sprocket means mounted with respect to said front and rear frame sections and including pedaling means to manually rotate said main sprocket means,
  g. drive means connecting said main sprocket means to said rear wheel to power and thereby rotate said rear wheel,
  h. said main sprocket means comprised of a disc-like member having a diametral size which extends forwardly of and rearwardly of said hinge means and said locking means, and
  i. said front axle means and rear axle means including cooperating locking means to releasably lock said front and rear axle means in an essentially colinear relationship.

11. The foldable-type bicycle of claim 10 further characterized in that said main sprocket means is transversely located on one side of said bicycle with respect to said hinge means and said locking means.

12. The foldable-type bicycle of claim 10 further characterized in that said drive means comprises a rear sprocket mounted with respect to said rear wheel, and a chain member connects said main sprocket means and said rear sprocket.

13. The foldable-type bicycle of claim 10 further characterized in that said pedaling means includes a pair of pedal crank arms operatively connected to said main sprocket means.

14. The foldable-type bicycle of claim 13 further characterized in that one of said crank arms comprises a hinged means and a crank arm locking means such that said crank arm can be shifted through a 180° arc to become somewhat parallel in space to the other of said crank arms.

15. The foldable-type bicycle of claim 10 further characterized in that said front and rear wheels are respectively mounted on front and rear axle means and that said front wheel is pivotally retained in a column on said front frame section.

16. The foldable-type bicycle of claim 13 further characterized in that said pedaling means includes a pair of pedal crank arms operatively connected to said main sprocket means.

17. A foldable-type bicycle comprising:
  a. a front frame section,
  b. a rear frame section,
  c. front and rear wheels respectively mounted on said front and rear frame sections,
  d. hinge means hingedly connecting said front and rear frame sections,
  e. locking means for rigidly but releasably connecting said front and rear frame sections in substantially parallel alignment and being released so that one of said frame sections can be swung with respect to the other of the sections in order to fold said bicycle,
  f. a main sprocket means including a sprocket shaft mounted with respect to said front and rear frame sections and including pedaling means to manually rotate said main sprocket means,
  g. drive means connecting said main sprocket means to said rear wheel to power and thereby rotate said rear wheel,
  h. a pedal crank arm operatively mounted with respect to said sprocket means to rotate said sprocket means about a transverse axis,
  i. crank arm hinge means connecting said crank arm to said sprocket means and permitting said crank arm to be rotated from a first position through approximately a 180° arc through an axis substantially perpendicular to said transverse axis to a second position,
  j. and crank arm locking means to releasably lock said crank arm in at least one of the first or second positions at the ends of said 180° arc, said crank arm locking means including a manually operable handle shiftable from a first handle position to a second handle position, a camming surface on said handle and engaging a portion of said pedal crank arm and holding same in either the first or second handle positions, and spring means located to operatively bear against and bias said pedal crank arm to said first or said second position.

18. The foldable-type bicycle of claim 17 further characterized in that adjustment means is located with respect to said crank arm and sprocket means to properly position said crank arm in said first or second positions.

19. The foldable-type bicycle of claim 17 further characterized in that a pedal is mounted on said crank arm and will extend outwardly in said first position and extend inwardly with respect to said frame sections when swung to the second position through said 180° arc.

20. The foldable-type bicycle of claim 17 further characterized in that an extendible seat member is operatively mounted on one of said front or rear frame sections in the region of the sprocket means for shiftable movement from an upright position to a lower position.

21. The foldable-type bicycle of claim 17 further characterized in that said main sprocket means comprises a smaller diameter sprocket and a larger diameter sprocket, said pedal crank arm being operatively connected to one of said smaller or larger diameter sprockets and the other of said sprockets being connected to said drive means.

22. A foldable-type bicycle comprising:
  a. a front frame section,
  b. a rear frame section,
  c. front and rear wheels respectively mounted on said front and rear frame sections,
  d. hinge means hingedly connecting said front and rear frame sections,
  e. locking means for rigidly but releasably connecting said front and rear frame sections in substantially parallel alignment and being released so that one of said frame sections can be swung with respect to the other of sections in order to fold said bicycle,
  f. an extensible multiple section seat post including a plurality of telescoping seat post sections, operatively mounted with respect to one of said front or rear frame sections,
  g. a seat mounted on the upper end of the uppermost of said seat post sections, and
  h. cable means operatively secured with respect to said seat and with respect to one of said seat post sections or frame sections to limit the uppermost extensible movement of said seat so that said seat can assume the same positional relationship with respect to the frame sections when extended from a collapsed condition to an to an open condition.

23. The foldable-type bicycle of claim 22 further characterized in that said seat post includes one fixed seat post section and two extensible telescopic seat post sections.

24. The foldable-type bicycle of claim 22 further characterized in that said cable means is secured at one end with respect to said seat and at the other end with respect to one of said frame sections, and a cable retaining block in one of said seat post sections.

25. The foldable-type bicycle of claim 22 further characterized in that a main sprocket means is mounted with respect to said front and rear frame sections and includes pedaling means to manually rotate said main sprocket means, said fixed seat post section being located in the region of said main sprocket.

26. A pedaling sprocket mechanism for use on a foldable-type bicycle including a pair of foldable frame sections comprising a main sprocket shaft, a main sprocket operatively mounted on said main sprocket shaft, an outer end on said sprocket shaft having a pair of flat walls thereon, a pedaling crank arm having a bifurcated upper end engaging the flat walls of said outer end of said sprocket shaft, pivot means pivotally securing the bifurcated end of said crank arm to the outer end of said sprocket shaft permitting said crank arm to swing through approximately a 180° arc from a first end position to a second end position, and locking means operatively connected to the outer end of said sprocket shaft and releasably locking said crank arm in one of said first or second end positions.

27. The pedaling sprocket mechanism of claim 26 further characterized in that a pivotal locking handle is mounted on the outer end of said sprocket shaft.

28. The pedaling sprocket mechanism of claim 27 further characterized in that spring biasing means is mounted on said sprocket shaft to operatively bear against said bifurcated end opposite said locking handle.

29. The pedaling sprocket mechanism of claim 27 further characterized in that said spring biasing means is a spring metal disc interposed between said sprocket and said bifurcated end.

30. An extensible multi-post seat structure for use on a foldable bicycle having a pair of frame sections with one of said frame sections being foldable with respect to the other of said frame sections, said multipost seat structure comprising a fixed seat post section mounted with respect to one of said first or second frame sections, at least one extensible seat post section telescopically extensible and collapsible within said fixed seat post section, a seat member mounted on the uppermost extensible seat post section, a cable secured with respect to the uppermost outer end of the uppermost extensible seat post and with respect to said frame sections to limit the uppermost extensible movement of said seat member so that said seat member can assume the same positional relationship with respect to said frame sections when extended from a collapsed condition to an open condition.

31. The extensible multi-post seat structure of claim 30 further characterized in that said seat post includes one fixed seat post section and two extensible telescopic seat post sections.

32. The extensible multi-post seat structure of claim 30 further characterized in that said cable means is secured at one end with respect to said seat member and at the other end with respect to one of said frame sections, and a cable retaining block in one of said seat post sections.

33. The extensible multi-post seat structure of claim 30 further characterized in that a quick-action releasable locking mechanism is operatively associated with one of said fixed or extensible seat post sections to permit telescopic movement and restrain said movement.

34. A quick-lock release mechanism for use with the releasable locking of two bicycle frame sections in an open aligned position which are capable of being folded with respect to one another about a somewhat central connecting hinge axis, said mechanism comprising a tubular duct in the region of said hinge axis operatively associated with respect to one of said frame sections, a locking pin extendible in said tubular duct and having at least one camming surface thereon, cooperating locking elements on each of said frame sections and being capable of engaging each other to hold the frame sections in a locking position and being releasable from each other so that said frame sections may be folded, and said locking pin being rotatable in said duct to have said camming surface engage one of said locking elements to bias same in a pair of angularly located planes to separate said locking elements so that one of said frame sections may be folded with with respect to the other.

35. The quick-lock release mechanism of claim 34 further characterized in that a main sprocket means is transversely located on one side of said bicycle frame sections with respect to said hinge axis and said locking elements.

36. The quick-lock release mechanism of claim 34 further characterized in that said angularly located planes are mutually perpendicular.

37. The quick-lock release mechanism of claim 34 further characterized in that a main sprocket means is mounted with respect to said frame sections in the region of said quick-lock release mechanism and includes pedaling means to manually rotate said main sprocket means, said main sprocket means is transversely located on one side of said bicycle frame sections with respect to said hinge axis and said mechanism.

38. The quick-lock release mechanism of claim 37 further characterized in that said main sprocket means comprises a disc-like member having a diametral size which extends forwardly of and rearwardly of said hinge axis and said mechanism.

39. A foldable-type bicycle comprising:
   a. a front frame section,
   b. a rear frame section,
   c. hinge means hingedly connecting said front frame section to said rear frame section fthrough a hinge axis,
   d. rear axle means for retaining a rear wheel on said rear frame section,
   e. a column on said front frame section and being pivotal on a column axis with respect to said front frame section,
   f. front axle means for retaining a front wheel on said front frame section,
   g. said front axle means being spaced forwardly of said column axis and said front wheel capable of being rotated about said column axis so that said front axle means is spaced rearwardly of said column axis and being spaced from said hinge axis by a distance approximately equal to the distance from said hinge axis to said rear axle means,
   h. said front frame section being pivotal about said hinge means so that said frame sections are shifted from the unfolded position to the folded position and where said rear axle means is essentially colinear with said front axle means in the folded position, and
   i. biasing means operatively associated with said frame sections to bias said frame sections in the folded and unfolded positions.

40. The foldable-type bicycle of claim 39 further characterized in that said biasing means comprises a spring biasing means extending between said frame sections.

41. A foldable-type bicycle comprising:
   a. a front frame section,
   b. a rear frame section,
   c. front and rear wheels respectively mounted on said front and rear frame sections,
   d. hinge means hingedly connecting said front and rear frame sections,
   e. locking means for rigidly but releasably connecting said front and rear frame sections in substantially parallel alignment and being released so that one of said frame sections can be swung with respect to the other of the sections in order to fold said bicycle,
   f. a main sprocket means mounted with respect to said front and rear frame sections and including pedaling means to manually rotate said main sprocket means,
   g. drive means connecting said means sprocket means to said rear wheel to power and thereby rotate said rear wheel,
   h. said main sprocket means comprised of a disc-like member having a diametral size which extends forwardly of and rearwardly of said hinge means and said locking means, and
   i. biasing means operatively associated with said frame section to bias said frame sections to the folded position and the position where the frame sections are in substantially parallel alignment.

42. The foldable-type bicycle of claim 41 further characterized in that said main sprocket means is transversely located on one side of said bicycle with respect to said hinge means and said locking means.

43. A foldable-type bicycle comprising:
   a. a front frame section,
   b. a rear frame section,
   c. front and rear wheels respectively mounted on said front and rear frame sections,
   d. hinge means hingedly connecting said front and rear frame sections,
   e. locking means for rigidly but releasably connecting said front and rear frame sections in substantially parallel alignment and being released so that one of said frame sections can be swung with respect to the other of the sections in order to fold said bicycle, said locking means comprising (1) cooperating locking elements on each of said frame sections and being capable of engaging each other to hold the frame sections in a locking position in substantiall parallel alignment and being releasable from each other so that said frame sections may be swung with respect to each other and folded, (2) and a locking pin having a camming surface engageable with one of said locking elements to bias same in a pair of angularly located planes to separate said locking elements so that one of said frame sections may be folded with respect to the other,
   f. a main sprocket means mounted with respect to said front and rear frame sections and including pedaling means to manually rotate said main sprocket means,
   g. drive means connecting said main sprocket means to said rear wheel to power and thereby rotate said rear wheel, and
   h. said main sprocket means comprised of a disc-like member having a diametral size which extends forwardly of and rearwardly of said hinge means and said locking means.

44. A foldable-type bicycle comprising:
   a. a front frame section,
   b. a rear frame section,
   c. front and rear wheels respectively mounted on said front and rear frame sections,
   d. hinge means hingedly connecting said front and rear frame sections,
   e. locking means for rigidly but releasably connecting said front and rear frame sections in substantially parallel alignment and being released so that one of said frame sections can be swung with respect to the other of the sections in order to fold said bicycle, said locking means comprising (1) cooperating locking elements on each of said frame sections and being capable of engaging each other to hold the frame sections in a locking position in substantially parallel alignment and being releasable from each other so that said frame sections may be swung with respect to each other and folded and (2) a locking pin having a camming surface engageable with one of said locking elements to bias same in a pair of angularly located planes to separate said locking elements so that one of said frame sections may be folded with respect to the other, f. a main sprocket means including a sprocket shaft mounted with respect to said front and rear frame sections and including pedaling means to manually rotate said main sprocket means, g. drive means connecting said main sprocket means to said rear wheel to power and thereby rotate said rear wheel, h. a pedal crank arm operatively mounted with respect to said sprocket means to rotate said sprocket means about a transverse axis, i. crank arm hinge means connecting said crank arm to said sprocket means and permitting said crank arm to be rotated from a first position through approximately a 180° arc through an axis substantially perpendicular to said transverse axis to a second position, j. and crank arm locking means to releasably lock said crank arm in at least one of the first or second positions at the ends of said 180° arc.

* * * * *